United States Patent [19]
Hanson

[11] Patent Number: 5,512,748
[45] Date of Patent: Apr. 30, 1996

[54] THERMAL IMAGING SYSTEM WITH A MONOLITHIC FOCAL PLANE ARRAY AND METHOD

[75] Inventor: Charles M. Hanson, Richardson, Tex.

[73] Assignee: Texas Instruments Incorporated, Dallas, Tex.

[21] Appl. No.: 281,711

[22] Filed: Jul. 26, 1994

[51] Int. Cl.⁶ .................................. G01J 5/02; G02F 1/13
[52] U.S. Cl. ........................................ 250/332; 250/331
[58] Field of Search ................................. 250/330, 331, 250/332, 338.2, 338.3, 349

[56] References Cited

U.S. PATENT DOCUMENTS

| | | | |
|---|---|---|---|
| 3,846,820 | 11/1974 | Lampe et al. | 357/31 |
| 4,018,608 | 4/1977 | Frazier | 96/27 |
| 4,080,532 | 3/1978 | Hopper | 250/332 |
| 4,142,207 | 2/1979 | McCormack et al. | |
| 4,143,269 | 3/1979 | McCormack et al. | 250/352 |
| 4,162,402 | 7/1979 | Hopper | 250/332 |
| 4,205,227 | 5/1980 | Reed | 250/330 |
| 4,275,302 | 6/1981 | Imbert et al. | 250/330 |
| 4,379,232 | 4/1983 | Hopper | 250/332 |
| 4,594,507 | 6/1986 | Elliott et al. | 250/331 |
| 4,615,595 | 10/1986 | Hornbeck | 353/122 |
| 4,670,654 | 6/1987 | Ross | 250/331 |
| 4,705,361 | 11/1987 | Frazier et al. | |
| 4,710,732 | 12/1987 | Hornbeck | 332/7.51 |
| 4,751,387 | 6/1988 | Robillard | 250/331 |
| 4,792,213 | 12/1988 | Hilsum | 250/331 X |
| 4,949,174 | 8/1990 | Wiltshire | 250/331 X |
| 4,956,619 | 9/1990 | Hornbeck | 330/4.3 |
| 4,994,672 | 2/1991 | Cross et al. | 250/330 |
| 5,010,251 | 4/1991 | Grinberg et al. | 250/332 |
| 5,021,663 | 6/1991 | Hornbeck | 250/349 |
| 5,047,644 | 9/1991 | Meissner et al. | 250/332 |
| 5,051,591 | 9/1991 | Trotta et al. | 250/351 |
| 5,061,049 | 10/1991 | Hornbeck | 359/224 |
| 5,083,857 | 1/1992 | Hornbeck | 359/291 |
| 5,196,703 | 3/1993 | Keenan | 250/332 |
| 5,238,530 | 8/1993 | Douglas et al. | 156/635 |
| 5,264,326 | 11/1993 | Meissner et al. | 430/313 |
| 5,367,167 | 11/1994 | Keenan | 250/338.4 |

FOREIGN PATENT DOCUMENTS

| | | |
|---|---|---|
| 939943 | 1/1974 | Canada . |
| 2251952 | of 1992 | United Kingdom . |
| 9116607 | of 1991 | WIPO . |

OTHER PUBLICATIONS

Stanley Wolf, Richard N. Tauber, "Silicon Processing for the VLSI ERA, vol. 1: Process Technology" *Lattice Press*, Sunset Beach, California, pp. 57–58, 110–113. (no date).

R. A. Wodd, et al. "HIDAD—A Monolithic, Silicon, Uncooled Infrared Imaging Focal Plane Array," 16.5/Wood/HIDAD pp. 579–581. (no date).

J. F. Li, et al., "Temperature Sensitivity of the Reflectance Coefficient of SbSi," *Ferroelectr. Lett. Sect.* 1990, 12(1), 1–7.

J. Li, et al., "Temperature dependence of optical constants of $MoS_2$ for Pyrooptical Devices," *Appl. Opt.* 1991 (30(13) 1583–4.

*Primary Examiner*—Carolyn E. Fields
*Assistant Examiner*—Edward J. Glick
*Attorney, Agent, or Firm*—Brian A. Carlson; James C. Kesterson; Richard L. Donaldson

[57] ABSTRACT

A thermal imaging system (10) contains a focal plane array (30) including a plurality of thermal sensors (32) mounted on a substrate (62). Each thermal sensor (32) includes a film layer (34) of infrared sensitive material which is both electronically and thermally isolated from the associated integrated circuit substrate (62). An image may be formed on the film layer (34) in response to infrared radiation from a scene (12). Electromagnetic radiation (22) from a source (visible light or near infrared) (20) is used to reproduce or transfer the image from the thermal sensors (32) onto the first surface (68) of the substrate (62). A thermoelectric cooler/heater (66) may be provided to optimally adjust the temperature of the substrate (62) to improve overall image quality.

21 Claims, 3 Drawing Sheets

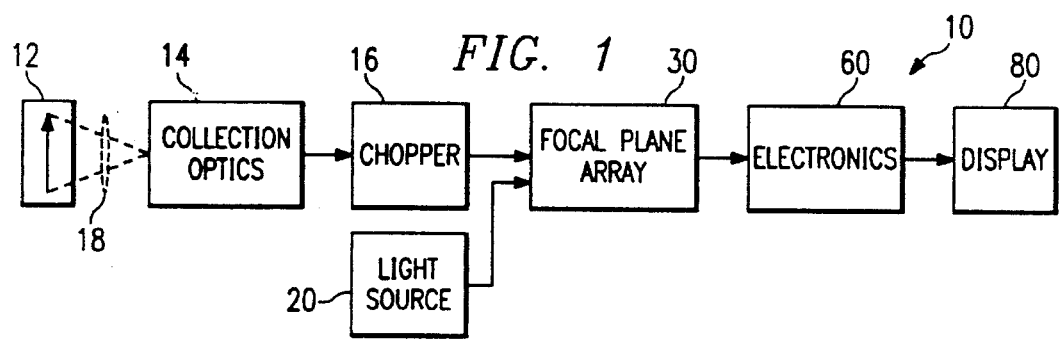
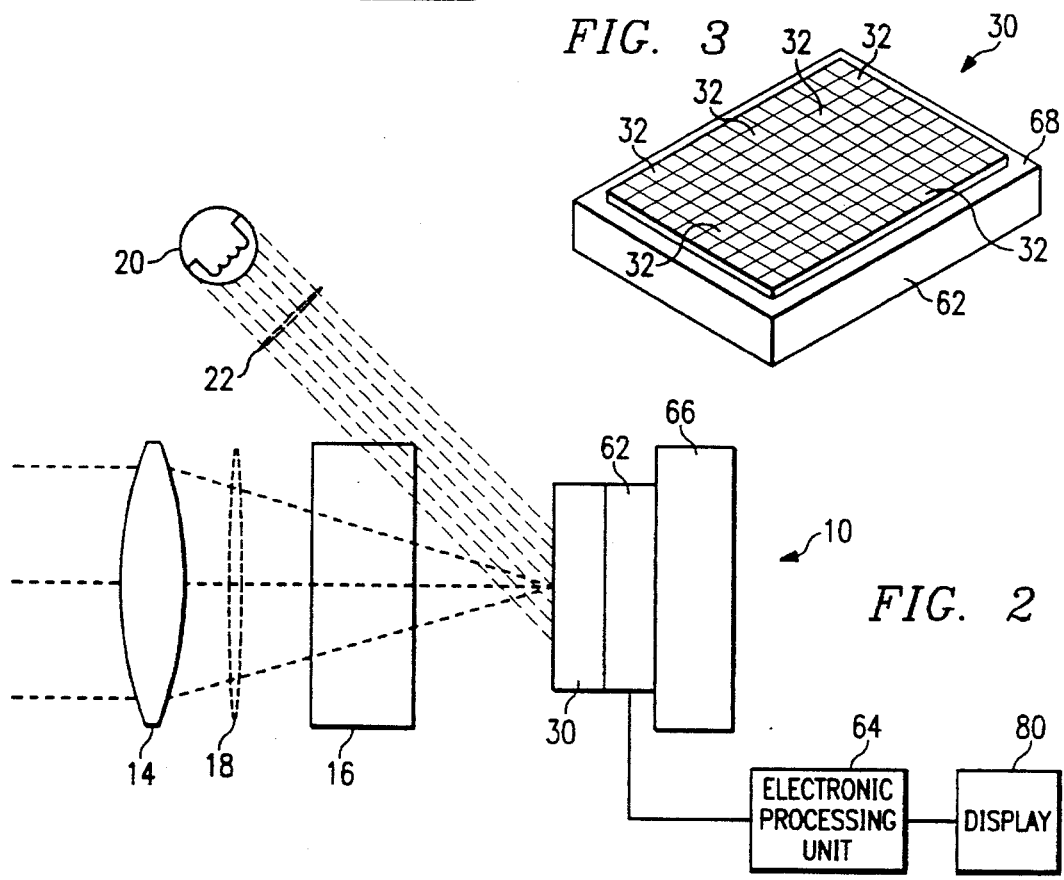
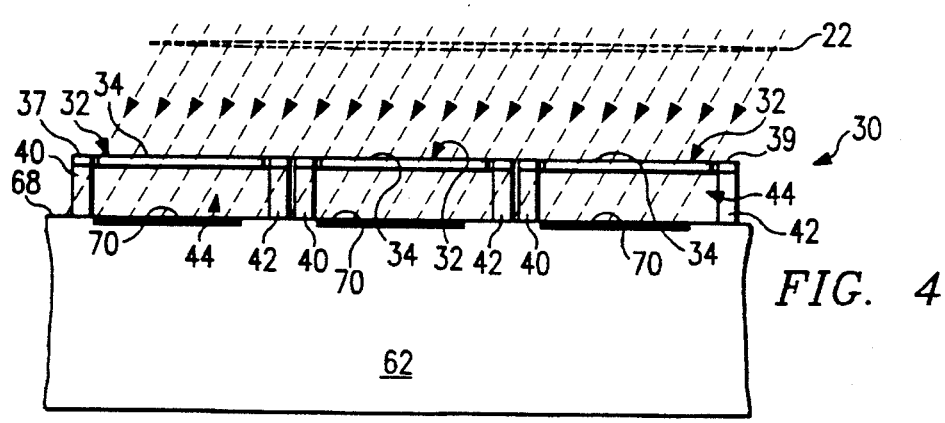

THERMAL IMAGING SYSTEM WITH A MONOLITHIC FOCAL PLANE ARRAY AND METHOD

RELATED APPLICATIONS

This application is related to copending application Ser. No. 08/368,067, entitled *Monolithic Thermal Detector with Pyroelectric Film and Method;* copending application Ser. No. 08/229,497, entitled *Thermal Imaging System With Integrated Thermal Chopper and Method;* and copending application Ser. No. 08/368,066, entitled *Focal Plane Array for Hybrid Thermal Imaging System and Method.* These applications are assigned to the same assignee.

TECHNICAL FIELD OF THE INVENTION

This invention relates generally to infrared or thermal imaging systems, and more particularly to uncooled thermal sensors which form a monolithic focal plane array.

BACKGROUND OF THE INVENTION

Infrared or thermal imaging systems typically use a plurality of thermal sensors to detect infrared radiation and produce an image capable of being visualized by the human eye. Thermal imaging systems typically detect thermal radiance differences between various objects in a scene and display these differences in thermal radiance as a visual image of the scene.

The basic components of a thermal imaging system generally include optics for collecting and focusing infrared radiation from a scene, an infrared detector having a plurality of thermal sensors for converting infrared radiation to an electrical signal, and electronics for amplifying and processing the electrical signal into a visual display or for storage in an appropriate medium. A chopper is often included in a thermal imaging system to produce a constant background radiance which provides a reference signal. The electronic processing portion of the thermal imagining system will subtract the reference signal from the total radiance signal to produce a signal with minimum background bias.

Thermal imaging systems may use a variety of infrared detectors which are sometimes classified into two main categories as cooled and uncooled. Uncooled detectors typically include thermal sensors which generate a change in voltage due to a change in temperature resulting from incident infrared radiation striking the thermal sensor. Cooled detectors typically include thermal sensors which generate a change in voltage due to a photoelectron interaction within the material used to form the thermal sensor. This latter effect is sometimes called the internal photoelectric effect.

A thermal detector having thermal sensors which generate a change in voltage due to a change in temperature resulting from incident infrared radiation striking the thermal sensors, generally includes thermal isolation between the thermal sensors and the associated integrated circuit substrate or signal processing portion of the thermal detector. Without effective thermal isolation, the thermal sensors will not respond satisfactorily to incident infrared radiation. Typically, such thermal sensors also require one or more electrical contacts to provide a signal to the associated integrated circuit substrate in response to incident infrared radiation. These electrical contacts often compromise or reduce the effectiveness of the thermal isolation between the respective thermal sensors and the associated integrated circuit substrate.

SUMMARY OF THE INVENTION

In accordance with the present invention, the disadvantages and problems associated with previous thermal imaging systems have been substantially reduced or eliminated. The present invention may include a monolithic and optically self-aligned array of thermal sensors which require no electrical contacts between the portion of each thermal sensor which responds to incident infrared radiation and the associated detection circuit or integrated circuit substrate. One embodiment of the present invention may also include a focal plane array having thermal sensors formed by a thin film layer of infrared sensitive material with a high degree of reticulation between adjacent pixel elements in the film layer to minimize thermal spreading between adjacent pixel elements and to improve the Modulation Transfer Function (MTF) of the resulting thermal sensors.

One aspect of the present invention includes a focal plane array disposed on an integrated circuit substrate. The focal plane array preferably includes a plurality of thermal sensors with infrared sensitive elements formed from pyro-optical material. An array of photosensors or photodetectors may preferably be disposed on the surface of the integrated circuit substrate adjacent to the focal plane array. The infrared sensitive elements which are preferably formed from pyro-optical material will vary the transmission of visible light through the respective infrared sensitive elements in response to incident infrared radiation. A source of visible light or near infrared may be provided to illuminate both the focal plane array and the photosensor array on the surface of the integrated surface substrate. Thus, an infrared image formed on the infrared sensitive elements of the thermal sensors in the focal plane array may be reproduced or copied onto the photosensor array by the visible light and/or near infrared transmission. Thermal isolation of the thermal sensors from the associated integrated circuit substrate may be substantially enhanced by eliminating the need for electrical signal contacts between the infrared sensitive elements of the respective thermal sensors and the integrated circuit substrate.

Another aspect of the present invention includes a method for producing a visual image of a scene using a thermal imaging system having one or more thermal sensors mounted on a substrate. Each thermal sensor preferably includes a thin film layer of infrared sensitive material which changes its optical transmission characteristics in response to incident infrared radiation. Multiple photodetectors sensitive to visible light and/or near infrared radiation are preferably disposed on the surface of the substrate adjacent to each thermal sensor. A visible light source and/or near infrared source is preferably provided to reproduce or replicate on the photodetectors any thermal images formed on the thin film layer. Both the light source and the photodetectors are preferably offset with respect to the film layer of the respective thermal sensors to simplify the optical design for the resulting thermal imaging system.

An important technical advantage of the present invention includes providing a thermal imaging system having a focal plane array with enhanced thermal isolation between the focal plane array and its associated integrated circuit substrate. The focal plane array preferably includes a plurality of thermal sensors which cooperate with each other to form an infrared image in response to incident infrared radiation. Visible light and/or near infrared radiation may be used to transmit or reproduce the infrared image from the film layer onto the adjacent surface of the associated integrated circuit substrate.

Another important technical advantage of the present invention includes providing a monolithic focal plane array of thermal sensors disposed on an integrated circuit substrate. An array of photosensors may be disposed on the surface of the integrated circuit substrate adjacent to the thermal sensors to receive infrared images formed by the focal play array. A visible light source may be provided to transmit or reproduce infrared images from the focal plane array onto the array of photosensors. Both the light source and the photosensor array are preferably offset from the axis of incident infrared radiation striking the focal plane array. The offset moves the visible light path out of the way of the IR path.

A still further technical advantage of the present invention includes eliminating expensive fabrication process steps associated with forming a thermal isolation structure between a focal plane array and its associated integrated circuit substrate. The present invention allows placing a highly reticulated, thin film layer of infrared sensitive material relatively close to an array of photosensors formed on the surface of an integrated circuit substrate. The position of the thin film layer close to the photosensor array prevents problems associated with scattering and diffraction of visible light at the edge of each pixel element of the film layer. The close proximity of the photosensors array to the focal plane array allows for self-alignment with respect to each other and substantially minimizes any alignment requirements for the visible optical portion of the associated thermal imaging system.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a block diagram of the components of a thermal imaging system constructed in accordance with an embodiment of the present invention;

FIG. 2 is a schematic representation of various components associated with the thermal imaging system of FIG. 1;

FIG. 3 is a schematic representation in elevation with portions broken away of a thermal detector having focal plane array with a plurality of thermal sensors disposed on an integrated substrate in accordance with one embodiment of the present invention;

FIG. 4 is an enlarged schematic representation in elevation and in section with portions broken away of a focal plane array having a plurality of thermal sensor mounted on a substrate incorporating an embodiment of the present invention;

DETAILED DESCRIPTION OF THE INVENTION

Figure 5:
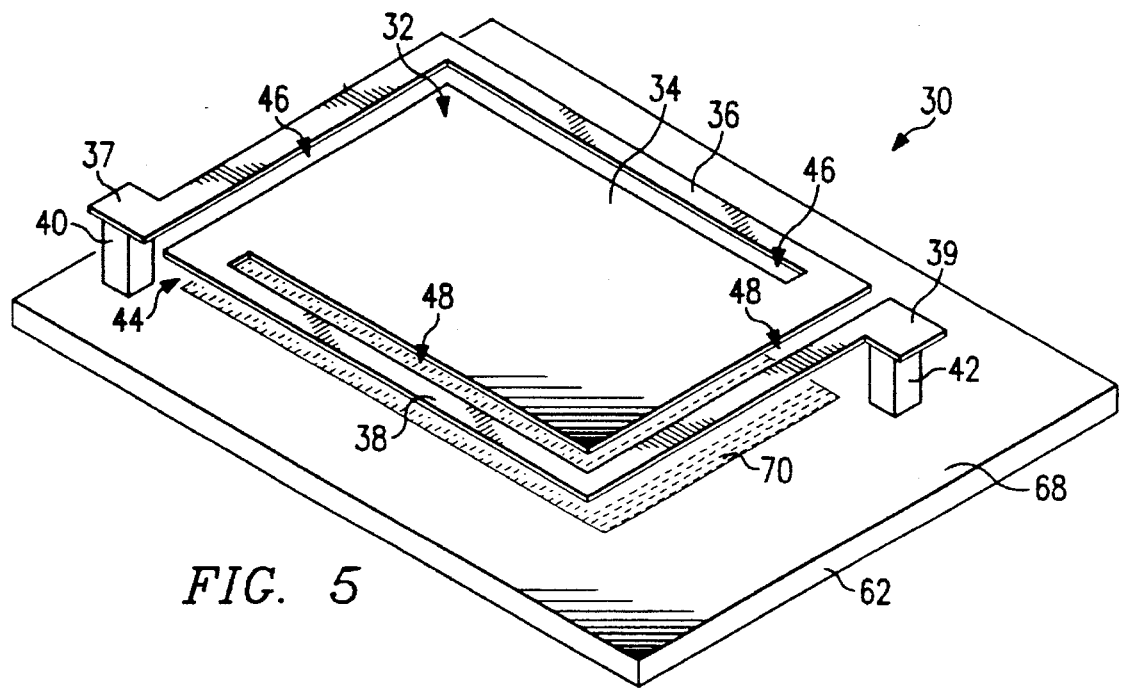
FIG. 5 is an enlarged isometric representation with portions broken away of one thermal sensor shown in FIG. 4.

The preferred embodiments of the present invention and its advantages are best understood by referring to FIGS. 1 through 7 of the drawings, like numerals being used for like and corresponding parts of the various drawings.

FIG. 1 is a block diagram of thermal imaging system 10 constructed in accordance with the present invention. During operation of thermal imaging system 10, infrared radiation from scene 12 is received by collection optics 14 and focused on focal plane array 30 through chopper 16. Signals from focal plane array 30 which correspond to the incident infrared radiation are delivered to electronics 60 where the signals are processed and passed to display 80.

Scene 12 may be any scene of objects that emit thermal radiation. As with all thermal imaging systems, the invention is especially useful when imaging by means of visual wavelengths is unavailable, such as in the dark or when vision is impaired by smoke, dust, or other particles. The invention is, of course, also useful during the day and when vision by means of the visual wavelengths is available.

Optics 14 are well known in the art of thermal imaging, and may be any one of a number of systems of lenses. Optics 14 produce a focused image on focal plane array 30, so that focal plane array 30 may sense the radiance of the incident infrared radiation it receives. Collection optics 14 may include one or more lenses made of material that transmits infrared radiation, such as germanium. The placement of optics 14 and chopper 16 with respect to focal plane array 30 is accomplished using well known principles of optical design as applied to thermal imaging systems.

Focal plane array 30 may be used as part of a wide variety of thermal detectors and thermal imaging systems. The invention may be used with either "staring" or "scanning" detectors. A staring detector is a large area detector onto which the entire thermal image is focused at once and read out electronically. A scanning detector uses a mirror or other means to sweep the infrared signal across the detector one element at a time. Usually, although not necessary for the invention, both types of detectors consist of a plurality of thermal sensors, with the output of each thermal sensor representing a portion of the viewed scene. For example, the output of each thermal sensor 32 in focal plane array 30 may represent a single pixel of the total image. Thermal sensors 32, as shown in FIGS. 3–7 incorporating the present invention, may be particularly beneficial for use in high density arrays and with high density visual displays.

Electronics 60 are provided to perform selected operations on the thermal image received from focal plane array 30. Some of the functions of electronics 60, such as amplifying a signal for use with visual display 80, are well known in the art of thermal imaging. Electronics 60 may include an integrated circuit substrate 62 on which focal plane array 30 is mounted. As will be explained later in more detail, integrated circuit substrate 62 preferably includes a detection circuit which responds to thermal images formed on the associated focal plane array. Electronics 60 may also include electronic processing unit 64 to perform various functions such as reading out the signal from substrate 62, video processing of the signal provided to display 80, controlling the operation of chopper 16 and thermoelectric heater/cooler assembly 66.

Depending upon the specific application for thermal imaging system 10 and the type of display 80, these various functions may be performed by integrate circuit substrate 62 and/or performed by circuits contained within electronic processing unit 64. Examples of electronic circuits which may be included as part of integrate circuit substrate 62 and/or electronic processing unit 64 are disclosed in U.S. Pat. No. 4,080,532 entitled "Ferroelectric Imaging System"; U.S. Pat. No. 4,162,402 entitled "Ferroelectric Imaging System"; and U.S. Pat. No. 5,021,663 entitled "Infrared Detector". By forming focal plane array 30 from a plurality of thermal sensors 32 incorporating the present invention, electronics 60 and display 80 will provide a substantially enhanced visual image based on infrared radiation emitted from scene 12.

Display 80 may be a special viewing device, such as a CRT. For some applications, thermal imaging system 10 may function as a radiometer and provide a measurement of the radiant energy incident on focal plane array 30. Depending on the type of display, an additional function of electronics 60 may be to transform the signals from focal plane array 30 into a format for use with display 80. The image on display 80 is typically a visual representation of the radiance image on focal plane array 30 emitted by scene 12.

Although not shown in FIG. 1, thermal imaging system 10 could be easily modified to permit digitization of the image signals so that the signals could be stored and processed as digital data. This requires sampling, storage, and processing devices, which are all well known in the field of video and graphics processing and may be included as part of electronics 60. The thermal imaging system 10 may also function as a radiometer to provide temperature measurements of radiant energy sources present in scene 12.

As shown in FIG. 2, chopper 16 may be a rotating disk with openings for interrupting the flow of incident infrared radiation from collection optics 14 to focal plane array 30. Various types of mechanical and/or electrical choppers may be satisfactorily used with the present invention. In the same respect, collection optics 14 may include various types of infrared lens systems depending upon the particular use for thermal imaging system 10. As previously noted, an infrared image corresponding to scene 12 is formed on focal plane array 30.

Light source 20 is provided for use in transferring the infrared image formed on focal plane array 30 to photosensors 70 disposed on the surface of integrated circuit substrate 62 adjacent to thermal sensors 32. For many applications, light source 20 preferably provides electromagnetic radiation 22 in the visible spectrum. For other applications, light source 20 may provide electromagnetic radiation 22 in the near infrared spectrum. The type of light source 20 and the electromagnetic radiation 22 emitted from light source 20 is selected to be compatible with photosensors 70 disposed on surface 68 of substrate 62. As will be explained later in more detail, the use of electromagnetic radiation 22 (either visible or near infrared) to transfer infrared images from thermal sensors 32 to photosensors 70 results in a substantial enhancement of the thermal isolation provided between thermal sensors 32 and associated integrated circuit substrate 62.

Collection optics 14 and chopper 16 cooperate with each other to produce two different infrared images on focal plane array 30. The first infrared image present on focal plane array 30 corresponds with the total radiance from objects in scene 12. When electromagnetic radiation 22 from light source 20 transfers or reproduces this first infrared image on photosensors 70, integrated circuit substrate 62 will generate a bias signal representing the total radiance from scene 12.

Collection optics 14 and chopper 16 cooperate to form a second infrared image on focal plane array 30 by scattering the incident infrared radiation such that the second infrared image corresponds with background radiance. Electromagnetic energy 22 from light source 20 in cooperation with photosensors 70 will produce a reference signal in integrated circuit substrate 62 corresponding with this background radiance. Electronics 60 including both integrated circuit substrate 62 and electronic processing unit 64 will cooperate with each other to process the bias signal and the reference signal to generate an unbiased signal which may be transformed into video data for display 80 or stored in a memory (not shown) for later processing.

The process of establishing a reference signal and receiving a bias signal is repeated in succession for additional frames of video data to be sent to display 80. It should be understood that the present invention contemplates either establishing a reference signal before or after detection of a bias signal, or establishing a reference signal before or after a predetermined number of bias signals have been received and processed. Electronics 60 preferably includes a control circuit (not shown) to operate thermoelectric cooler/heater 66 to adjust the temperature of substrate 62 to produce optimum sensitivity.

FIG. 3 shows focal plane array 30 comprising the desired number of thermal sensors 32 arranged in a matrix and overlying substrate 62. The quantity and location of thermal sensors 32 will depend upon the desired N by M configuration for focal plane array 30. For one embodiment, each thermal sensor 32 provides a pixel of video data to display 80. The present invention allows for a high degree of reticulation between adjacent thermal sensors 32 which substantially reduces thermal spreading between pixel elements.

Substrate 62 may be an integrated circuit substrate that provides the necessary electrical couplings and circuitry to control chopper 16, thermoelectric heater/cooler assembly 66, and process the infrared image formed on focal plane array 30. U.S. Pat. No. 4,143,269, issued to McCormack, et al., entitled "Ferroelectric Imaging System" and U.S. Pat. No. 5,021,663 issued to Hornbeck, entitled "Infrared Detector," both disclose thermal sensors mounted on an underlying integrated circuit substrate.

FIG. 4 shows an enlarged schematic representation of three thermal sensors 32 disposed on surface 68 of substrate 62. Photosensors 70 are preferably disposed on surface 68 of substrate 62 adjacent to respective thermal sensors 32 in accordance with the teachings of the present invention. The number of photosensors 70 associated with each thermal sensor 32 is dependent upon the size and location of the respective thermal sensor 32. As shown in FIG. 5, each thermal sensor 32 may include a thin film layer 34 formed from infrared sensitive material. A pair of bifurcated supporting arms 36 and 38 is preferably attached to each film layer 34. At least two posts 40 and 42 are provided to position film layer 34 relative to surface 68 of substrate 62 with gap 44 formed therebetween.

For some applications, film layer 34 of each thermal sensor 32 is preferably formed from pyroelectric materials such as barium strontium titanate (BST), barium titanate (BT), antimony sulfoiodide (SbSI), any material in the lead titanate family including lead titanate (PT), lead lanthanum titanate (PLT), lead zirconate titanate (PZT), and lead lanthanum zirconate titanate (PZLT). It should be understood that the present invention contemplates forming film layer 34 of thermal sensors 32 from any pyro-optical material or other thermal sensitive material that provides a satisfactory change in visible light transmission in response to changing incident infrared radiation.

For some applications, film layer 34 may be formed from liquid crystals and/or semiconductor material having an edge absorption which is temperature dependent. The thermal sensitive material which is used to form film layer 34 will depend upon the wavelength of the incident infrared radiation which thermal imaging system 10 is designed to detect, the desired physical characteristics of thermal sensor 32, and the type of photodetectors used in photosensor array 70. For one embodiment of the present invention, film layer 34 is formed from pyro-electric material such as barium strontium titanate having an index of refraction which changes with temperature variations resulting from incident infrared radiation. Film layer 34 is preferably very thin to enhance its response to incident infrared radiation and to allow transmission of electromagnetic energy 22 therethrough. Changes in refraction of the pyro-electric material will affect the amount of electromagnetic radiation 22 transmitted through film layer 34.

Gap 44 may be varied depending upon the wavelength of the incident infrared radiation which thermal imaging system 10 is designed to detect. Gap 44 preferably corresponds to one-fourth of the selected incident infrared radiation wavelength. Thus, if thermal imaging system 10 is designed to detect infrared radiation having a wavelength of ten to twelve microns, gap 44 preferably has a height of approximately two and a half to three microns. The ability to vary the position of film layer 34 with respect to surface 68 of integrated circuit substrate 62 enhances the responsiveness of film layer 34 to incident infrared radiation. The relatively small gap between film layers 34 and photosensors 70 allows for self-alignment of these components.

Posts 40 and 42 are preferably formed from material which is thermally nonconductive. A plurality of posts 40 and 42 may be disposed adjacent to their associated photosensors 70 on surface 68 of substrate 62 using photolithography techniques associated with semiconductor fabrication. In the same respect, each layer 34 and its associated supporting arms 36 and 38 may be disposed on their associated posts 40 and 42 using appropriate photolithography techniques. U.S. Pat. No. 4,956,619 entitled "Spatial Light Modulator" and U.S. Pat. No. 5,083,857 entitled "Multi-Level Deformable Mirror Device" show typical semiconductor fabrication techniques satisfactory for use with the present invention.

For many applications, supporting arms 36 and 38 are preferably formed from the same type of material as film layers 34. The length, width and thickness dimensions of supporting arms 36 and 38 are selected to enhance the resistance to transfer of thermal energy from film layer 34 to post 40 and 42, respectively. Slots 46 and 48 extend between respective supporting arms 36 and 38 to provide additional thermal isolation between film layer 34 and associated supporting arms 36 and 38. Slots 46 and 48 also cooperate with similar slots 46 and 48 associated with adjacent film layer 34 to prevent undesired thermal transfer between adjacent film layers 34. Electromechanical operation of a digital micromirror device (DMD) used in video display systems is described in U.S. Pat. No. 5,061,049 to Hornbeck and assigned to Texas Instruments Incorporated, the assignee of this invention. U.S. Pat. No. 5,021,663 to Hornbeck and assigned to Texas Instruments Incorporated, the assignee of this invention, shows a bolometer with bifurcated leads.

Figure 6:
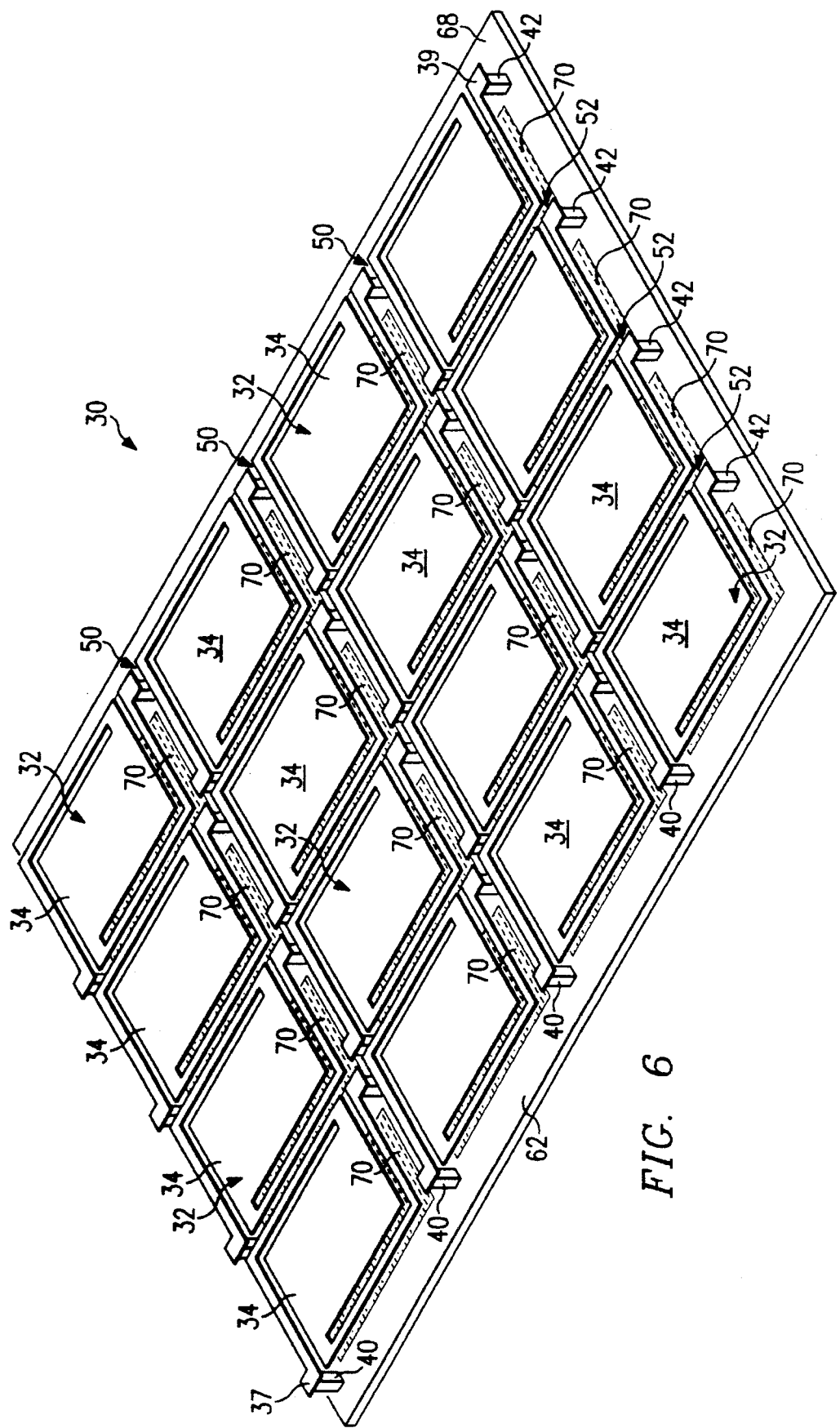
FIG. 6 is an enlarged isometric representation with portion broken away of the focal plane array and associate substrate of FIG. 4.

As best shown in FIG. 6, each thermal sensor 32 may be formed as a separate discrete element in focal plane array 30. A plurality of horizontal slots 50 and vertical slots 52 may be provided around the perimeter of each thermal sensor 32 to further enhance the thermal isolation between adjacent thermal sensors 32. Slots 46 and 48 associated with supporting arms 36 and 38 along with slots 50 and 52 cooperate to enhance the thermal isolation between adjacent thermal sensors 32 and their associated film layers 34. Slots 46, 48, 50, and 52 cooperate to substantially reduce thermal spreading between adjacent pixel elements associated with each thermal sensor 32.

As best shown in FIGS. 2 and 4, light source 20 is preferably offset with respect to the axis of incident infrared radiation striking focal plane array 30. Groups of photosensors 70 are preferably disposed on surface 68 of integrated circuit substrate 62 adjacent to each thermal sensor 32. Each group of photosensors 70 is preferably offset with respect to film layer 34 of associated thermal sensor 32. The offset between film layers 34 and associated photosensors 70 is best shown in FIGS. 4 and 5.

Various types of photosensors and/or photodetectors 70 may be disposed on surface 68 of integrated circuit substrate 62. Examples of such photosensors include photoconductive cells, photodiodes, photoresistors, photoswitches, phototransistors, photovoltaic cells, and/or charged coupled devices. The specific type of photosensor may be selected depending upon the electromagnetic radiation provided by light source 20, the transmission characteristics of associated film layer 34 and the desired sensitivity to incident infrared radiation striking focal plane array 30.

Figure 7:
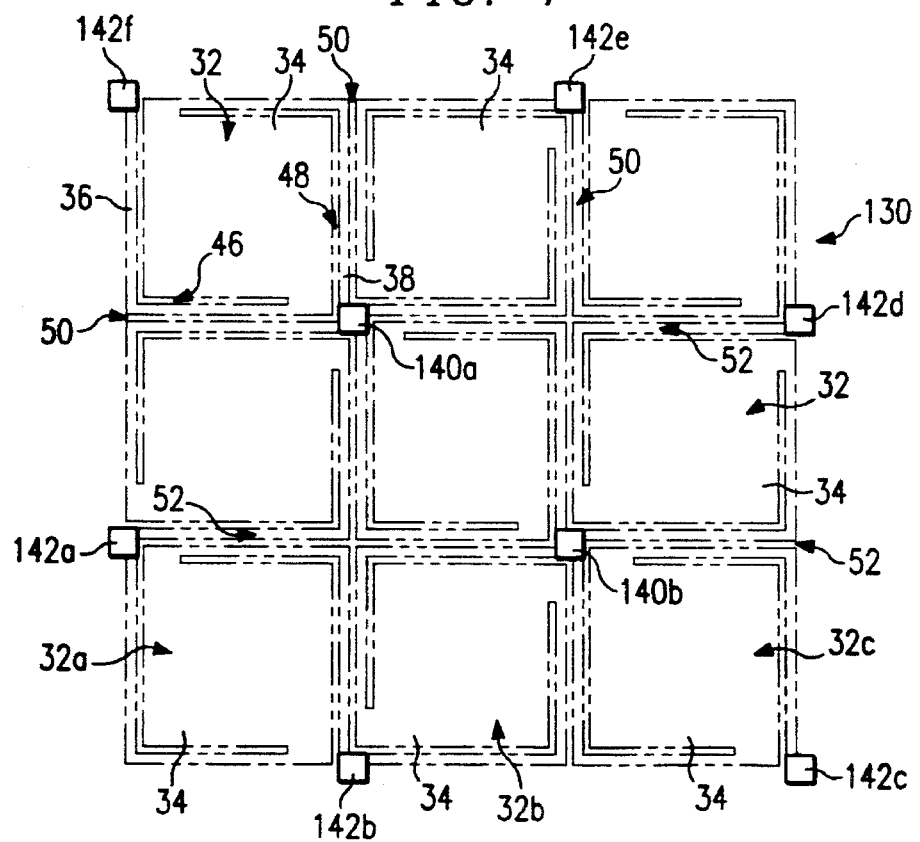
FIG. 7 is a schematic plan view showing a portion of a focal plane array and its associated thermal sensors incorporating another embodiment of the present invention.

It should be understood that the present invention contemplates alternate configurations of thermal sensors 32 and their associated focal plane array. For example, focal plane array 130 as shown in FIG. 7 demonstrates that the present invention allows positioning nine thermal sensors 32 on the surface of an integrated circuit substrate by using only eight posts. For the embodiment shown in FIG. 7, one supporting arm from four thermal sensors 32 is preferably disposed on post 140a and one supporting arm from four thermal sensors 32 is disposed on post 140b. Each post 142a–f has either one or two supporting arms from adjacent thermal sensors 32 resting thereon. This configuration allows slots 46, 48, 50, and 52 to provide the desired thermal isolation between adjacent thermal sensors 32, even though the number of posts 140 and 142 have been substantially reduced as compared to the number of posts 40 and 42 required for focal plane array 30.

Design selection for a thermal imaging system incorporating the present invention is typically an iterative process during which various infrared sensitive materials are evaluated for use in forming film layer 34 and various photodetectors are evaluated for use in providing the desired array of photosensors 70 on substrate 62. Typically, the selection process will involve evaluating the index of refraction of various materials in response to temperature changes resulting from incident infrared radiation. The Fresnel formula for reflectivity and transmissivity may be used to select the desired material and physical dimensions for each thermal sensor 32.

A similar evaluation can be performed with respect to light source 20 and the type of electromagnetic radiation projected from light source 20 onto focal plane array 30 and surface 68 of integrated circuit substrate 62. The infrared sensitive materials and photosensors may also be varied depending upon the desired display 80. By eliminating the need for electrical contacts between the infrared sensitive material and substrate 62 of the present invention substantially increases the design options which are available to enhance the performance of the resulting thermal imaging system.

Although the present invention and its advantages have been described in detail, it should be understood that various changes, substitutions and alterations can be made therein without departing from the spirit and scope of the invention as defined by the appended claims.

What is claimed is:

1. A thermal sensor mounted on an integrated circuit substrate to provide an image representative of the amount of infrared radiation incident to the thermal sensor comprising:

a film layer of infrared sensitive material disposed adjacent to a first surface of the substrate with a gap formed therebetween, wherein said gap is approximately one-fourth of a wavelength of said infrared radiation;

a plurality of photosensors disposed on the first surface of the substrate adjacent to the film layer; and a supporting structure for providing thermal and electrical isolation between the film layer and the substrate.

2. The thermal sensor of claim 1 wherein the supporting structure further comprises:

at least two posts disposed on the first surface of the substrate adjacent to the associated photosensors; and a pair of bifurcated arms attached to the film layer and the respective supporting posts.

3. The thermal sensor of claim 1 wherein the photosensors further comprise a plurality of photodiodes.

4. The thermal sensor of claim 1 wherein the film layer is formed from material selected from the group consisting of pyro-optical material, liquid crystals, and semiconductor material with a temperature dependent absorption edge.

5. The thermal sensor of claim 1 wherein the film layer is formed from material selected from the group consisting of barium strontium titanate, barium titanate, antimony sulfoiodide, lead titanate, and lead lanthanum zirconate titanate.

6. A thermal imaging system for producing an image of a scene in response to incident infrared radiation from the scene, comprising:

optics for focusing incident infrared radiation emitted by the scene onto a focal plane array;

a chopper for the incident infrared radiation disposed between the optics and the focal plane array;

the focal plane array including a plurality of thermal sensors for detecting the incident infrared radiation mounted on a substrate with each thermal sensor having a film layer formed from infrared sensitive material which changes its light transmission characteristics in response to incident infrared radiation;

a plurality of photosensors disposed on the substrate adjacent to each thermal sensor;

a light source disposed adjacent to the focal plane array and the substrate to project electromagnetic radiation onto both the focal plane array and the substrate for use in transferring thermal-images formed on the film layer of each thermal sensor to the associated photosensors;

the film layer and the photosensors cooperating with the chopper and the light source to produce a biased signal and a reference signal;

electronics for receiving the biased signal and the reference signal and for subtracting the reference signal from the biased signal to obtain an unbiased signal representing radiance differences emitted by objects in the scene; and a display for receiving the unbiased signal and for displaying an image generated in response to the unbiased signal.

7. The system of claim 6, wherein each of the thermal sensors further comprises:

a pair of posts mounted on the substrate adjacent to the associated photosensors;

a pair of arms attached to the film layer and the respective posts; and the posts cooperate with the respective pair of arms to form a gap between the film layer and associated photosensors equal to approximately one-quarter (¼) of the wavelength of the incident infrared radiation detected by the thermal sensors.

8. The system of claim 6, wherein the light source projects electromagnetic radiation from portions of the visible light spectrum and the near infrared spectrum.

9. The system of claim 6, wherein the photosensors are selected from the group consisting of photoconductive cells, photodiodes, photoresistors, photoswitches, phototransistors, photovoltaic cells, and charged coupled devices.

10. A focal plane array including a plurality of thermal sensors mounted on an integrated circuit substrate to provide a signal representative of the amount of thermal radiation incident to the focal plane array, each thermal sensor comprising:

a layer of infrared sensitive film disposed adjacent to a first surface of the integrated circuit substrate with a gap formed therebetween;

a plurality of photosensors disposed on the first surface of the integrated circuit substrate adjacent to the respective thermal sensor; and a supporting structure for providing thermal and electrical isolation between the film layer and the integrated circuit substrate.

11. The focal plane array of claim 10, wherein the supporting structure for each thermal sensor further comprises:

at least two posts disposed on the first surface of the integrated circuit substrate adjacent to the associated photosensors;

a pair of arms attached to the film layer and the respective supporting posts; and the pair of arms and the respective supporting posts cooperating to define in part the gap between the film layer of each thermal sensor and the first surface of the integrated circuit substrate.

12. The focal plane array of claim 10 further comprising the plurality of photosensors associated with each thermal sensor offset from the respective film layer to receive electromagnetic radiation from a light source.

13. The focal plane array of claim 10 wherein the film layer of each thermal sensor is formed from material selected from the group consisting of barium strontium titanate, barium titanate, antimony sulfoiodide, lead titanate, and lead lanthanum zirconate titanate.

14. The focal plane array of claim 10 further comprising a light source disposed adjacent to the focal plane array and the integrated circuit substrate to project electromagnetic radiation on both the focal plane array and the integrated circuit substrate for use in transferring thermal images formed on the film layer of each thermal sensor onto the photosensors associated with each thermal sensor.

15. The focal plane array of claim 10 further comprising a plurality of opening formed between adjacent thermal sensors and between the supporting structure for the film layer of each thermal sensor to minimize thermal spreading between adjacent thermal sensors.

16. A method for producing an image of a scene using a thermal imaging system having a plurality of thermal sensors with infrared sensitive elements mounted on a substrate, comprising the steps of:

thermally and electrically isolating the infrared sensitive element of each thermal sensor from the integrated circuit substrate;

directing incident infrared radiation from the scene onto the infrared sensitive elements of the thermal sensors to form a thermal image;

projecting electromagnetic radiation from a light source onto the thermal sensors and the adjacent surface of the substrate; and detecting the electromagnetic radiation with a group of photosensors disposed on the surface of the substrate to form a signal representative of the image formed on the infrared sensitive element of the respective thermal sensor.

17. The method of claim 16, further comprising the step of processing the signal from the photosensors to provide a visual display of the scene.

18. The method of claim 16, further comprising the steps of:

chopping the incident infrared radiation and controlling the temperature of the substrate to establish a reference signal;

forming a bias signal representing the total radiance of the scene from the photodiodes on the surface of the substrate;

subtracting the reference signal from the bias signal to obtain an unbiased signal representing radiance differences emitted by objects in the scene; and displaying an image in response to the unbiased signal.

19. The method of claim 16, further comprising the step of thermally isolating the infrared sensitive element of each thermal sensor from the substrate.

20. The method of claim 16, further comprising the step of mounting each infrared sensitive element on the substrate with a plurality of slots around the perimeter of each thermal sensor to minimize thermal spreading between adjacent infrared sensitive elements.

21. A thermal sensor mounted on a substrate to provide an image representative of the mount of thermal radiation incident to the thermal sensor comprising:

a film layer of infrared sensitive material disposed adjacent to a first surface of the substrate with a gap formed therebetween, wherein said film layer is formed from material selected from the group consisting of barium strontium titanate, barium titanate, antimony sulfoiodide, lead titanate, and lead lanthanum zirconate titanate;

a plurality of photosensors disposed on the first surface of the substrate adjacent to the film layer; and a supporting structure for providing thermal and electrical isolation between the film layer and the substrate.

\* \* \* \* \*